May 23, 1961  C. F. KOHLER ET AL  2,985,368
PRODUCTION CONTROL SYSTEM
Filed May 23, 1956  8 Sheets-Sheet 1
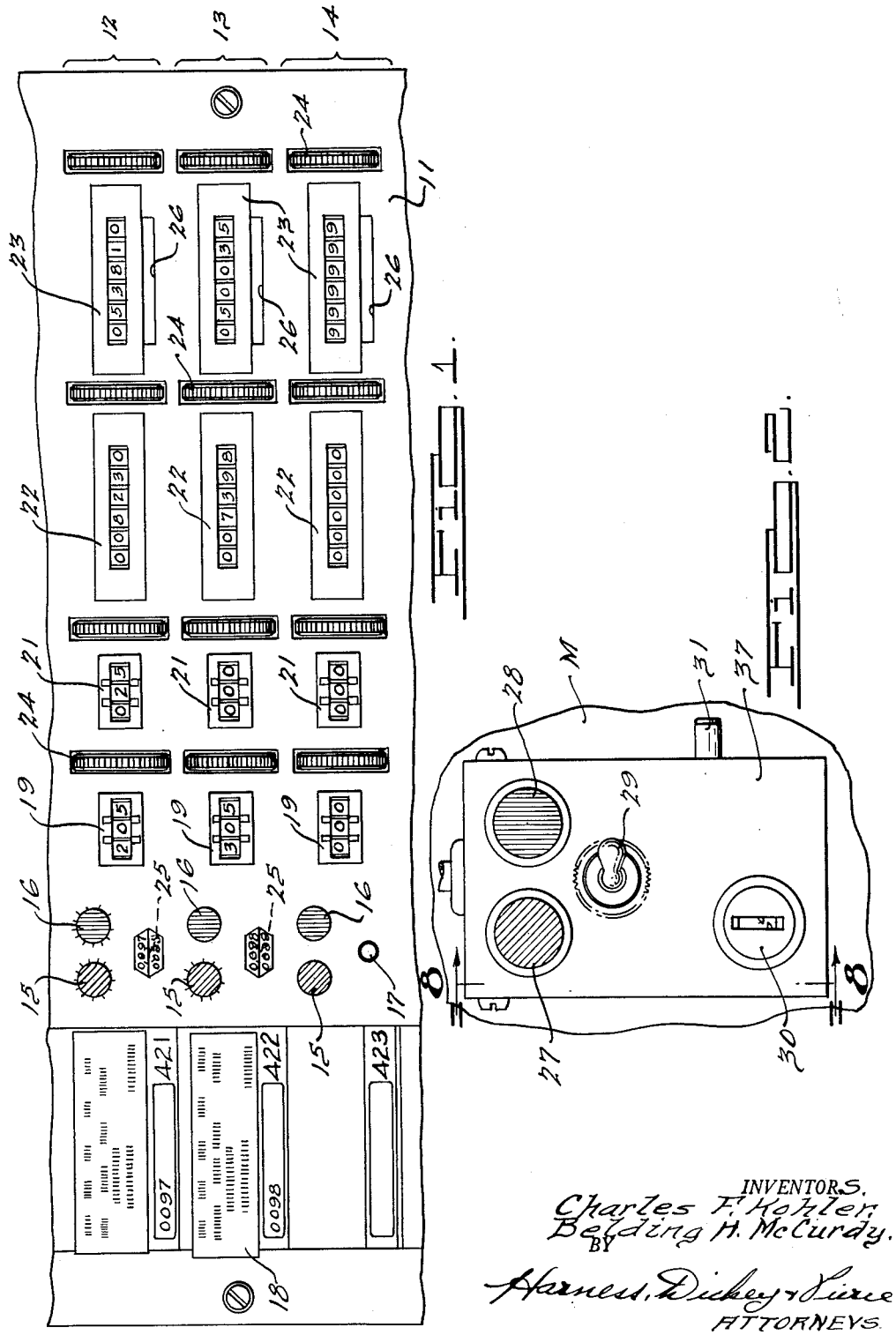
INVENTORS.
Charles F. Kohler,
Belding H. McCurdy.
BY
Harness, Dickey & Pierce
ATTORNEYS.

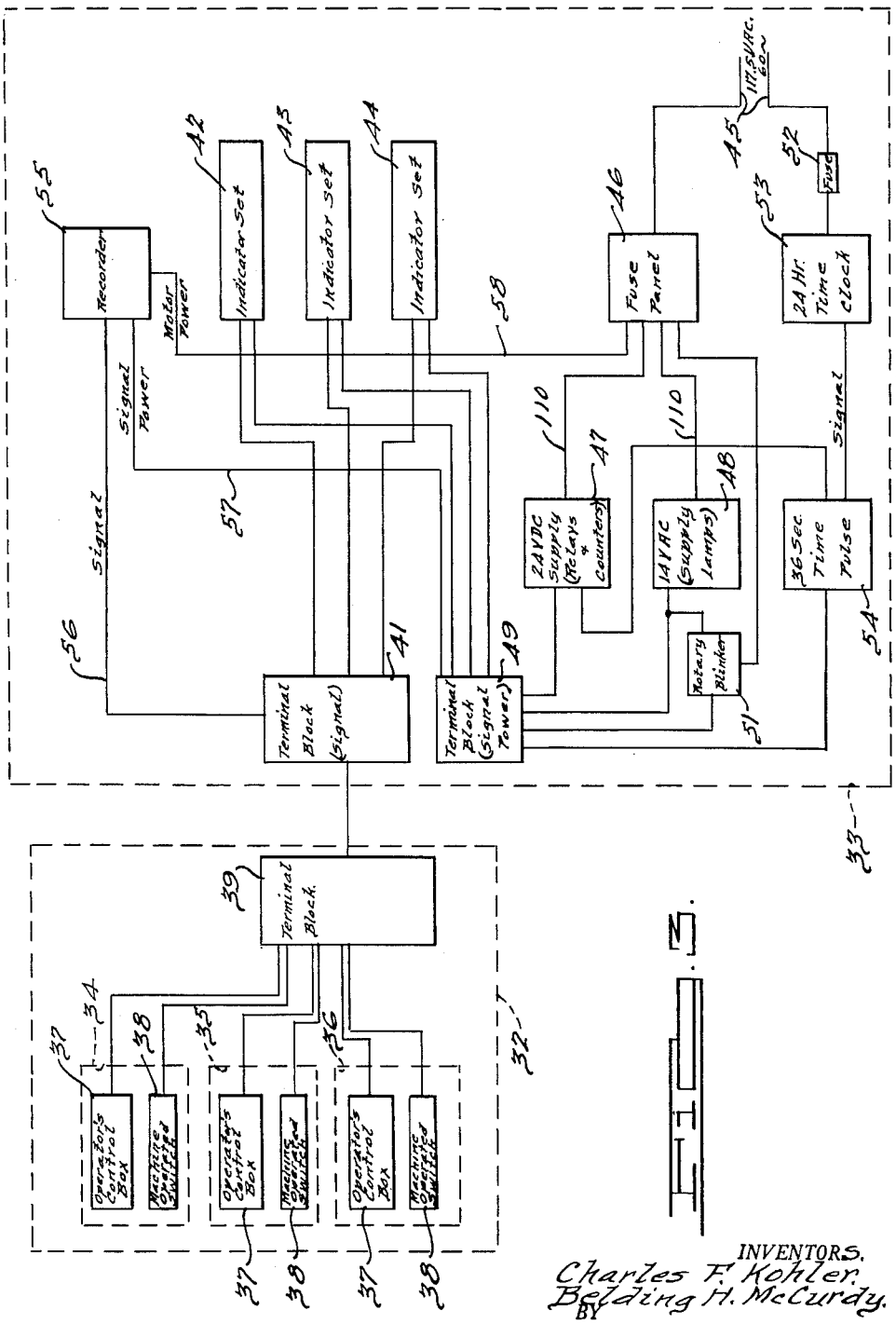

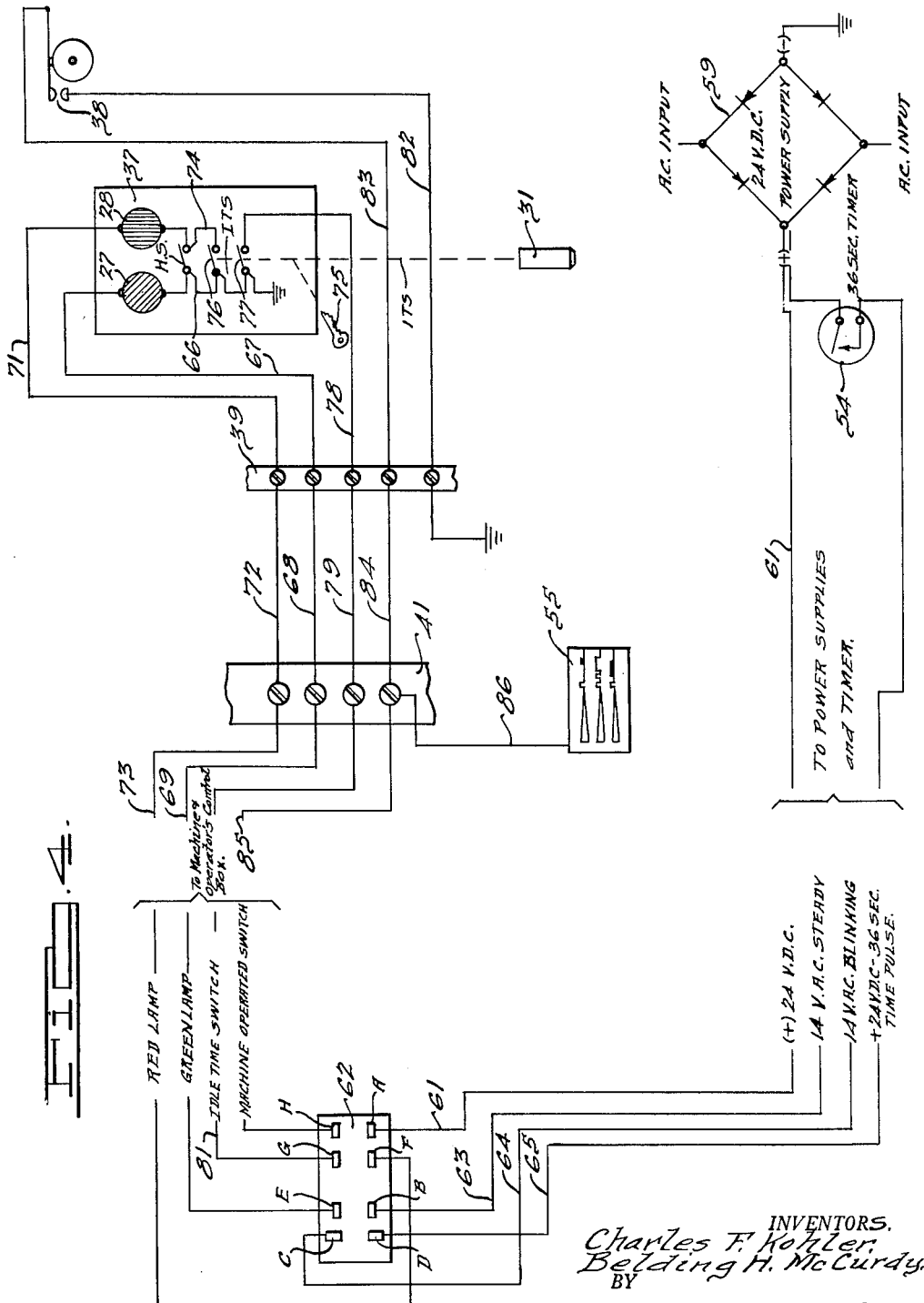

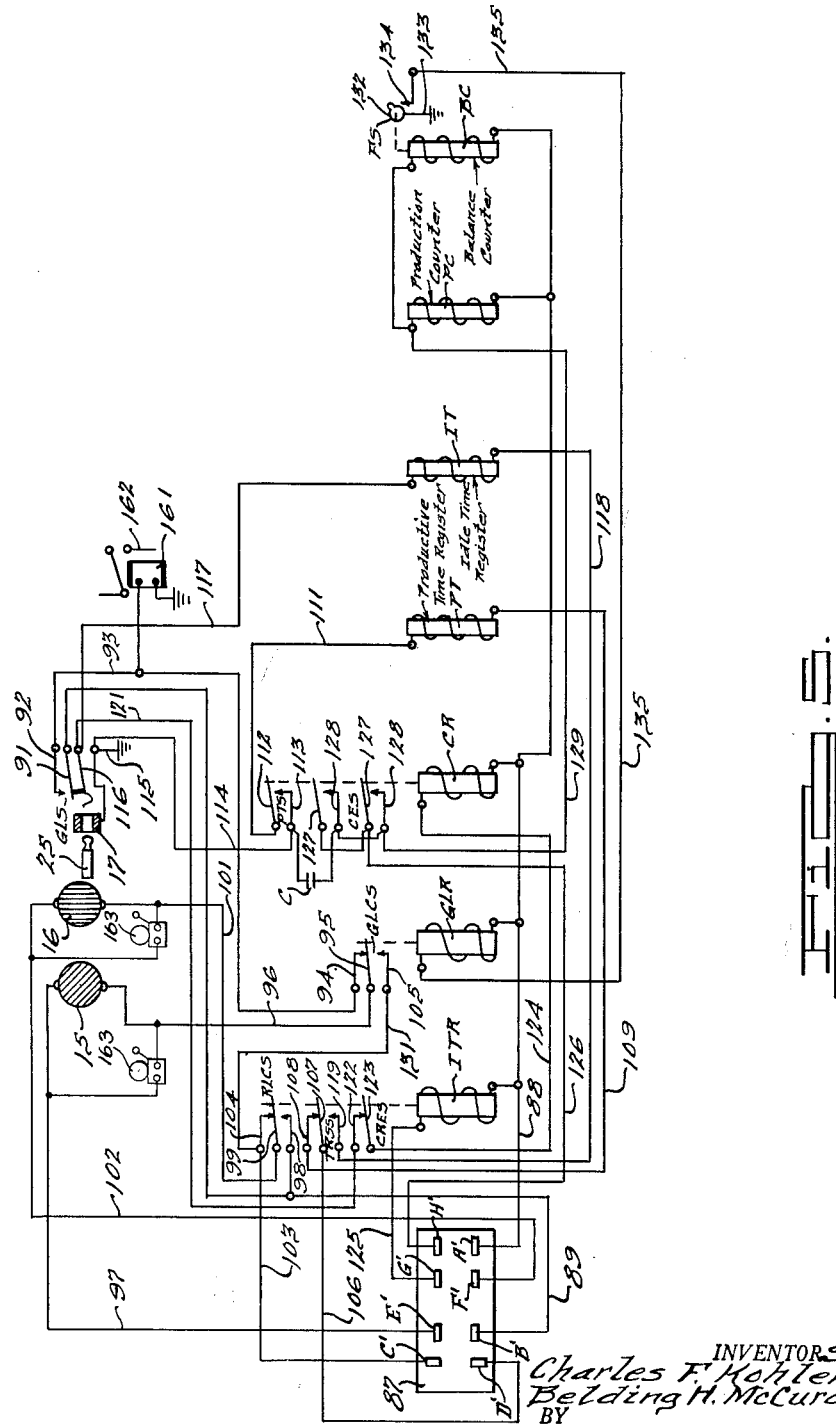

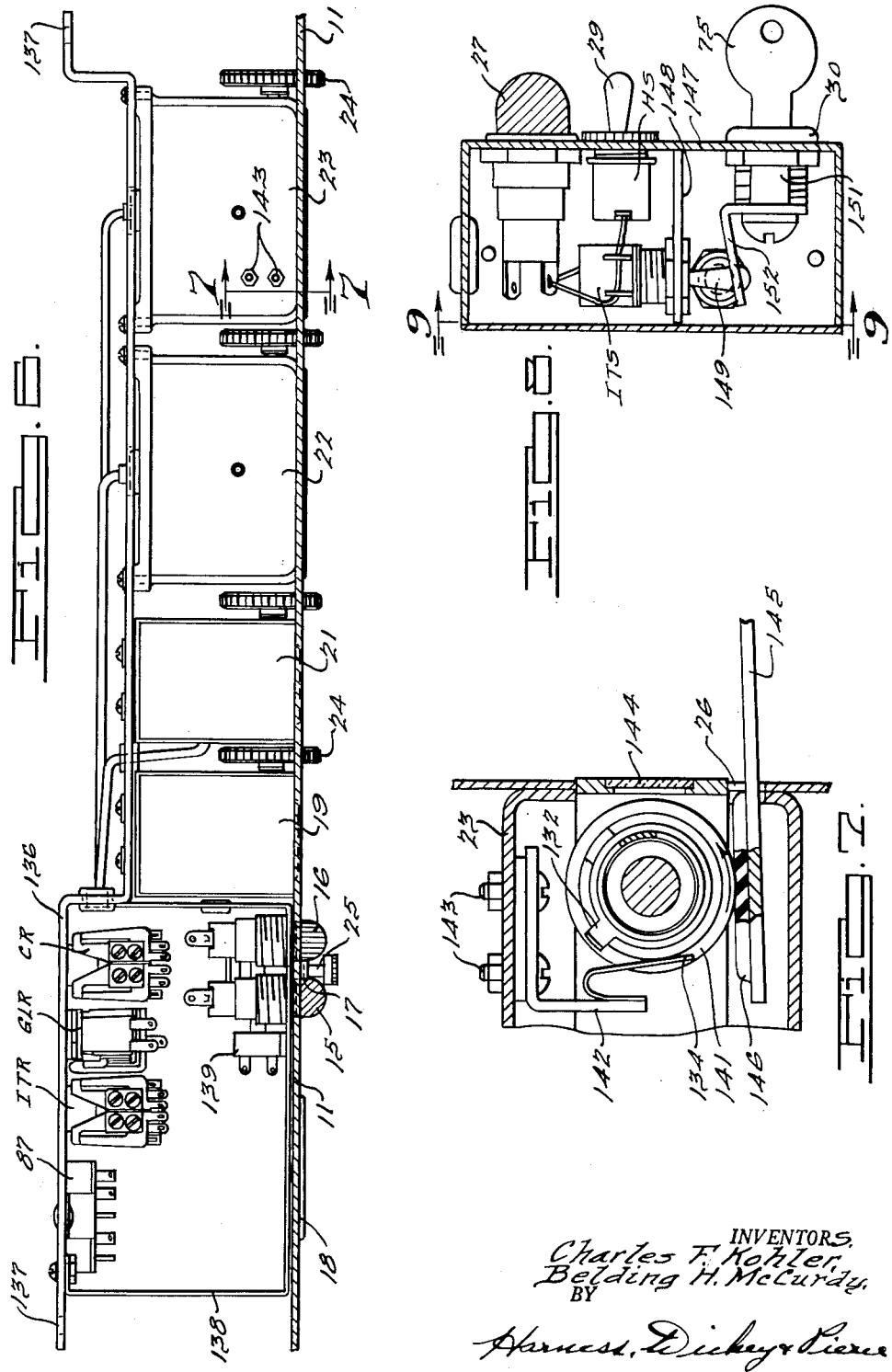

May 23, 1961    C. F. KOHLER ET AL    2,985,368
PRODUCTION CONTROL SYSTEM
Filed May 23, 1956    8 Sheets-Sheet 6

INVENTORS.
Charles F. Kohler,
Belding H. McCurdy
BY
Harness, Dickey & Pierce
ATTORNEYS.

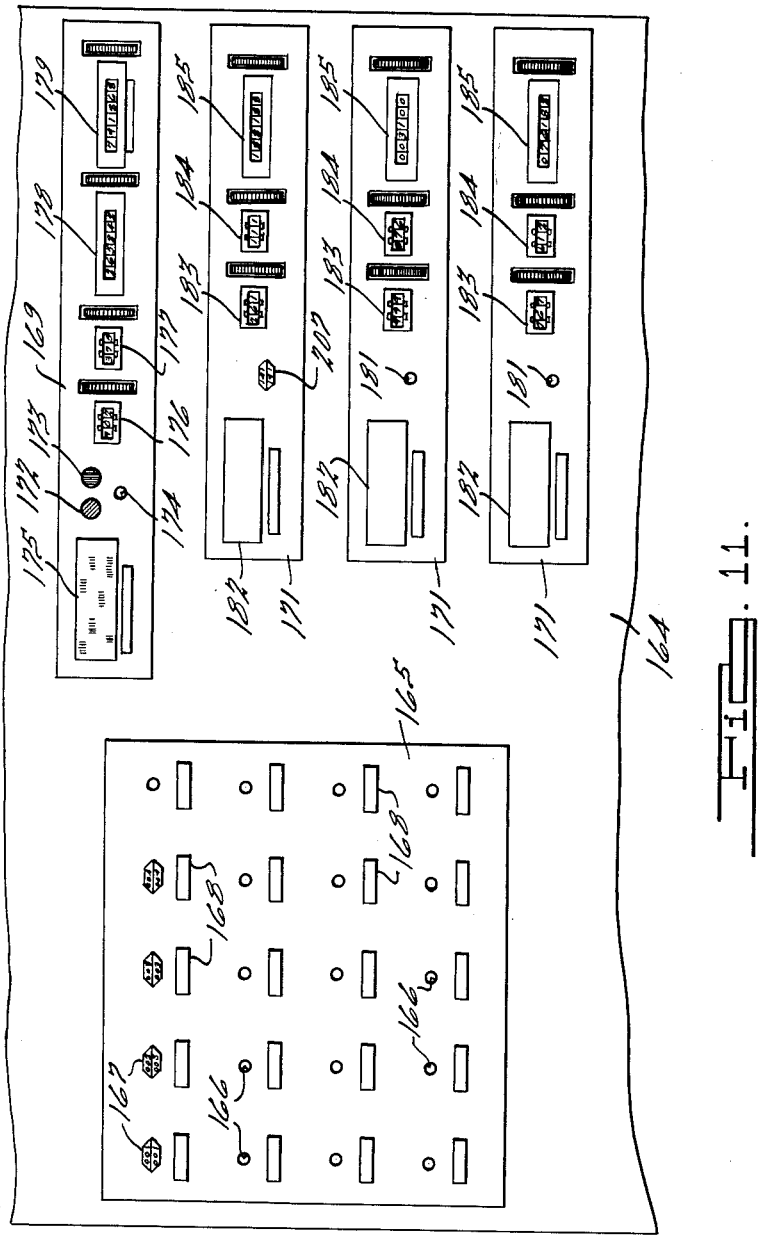

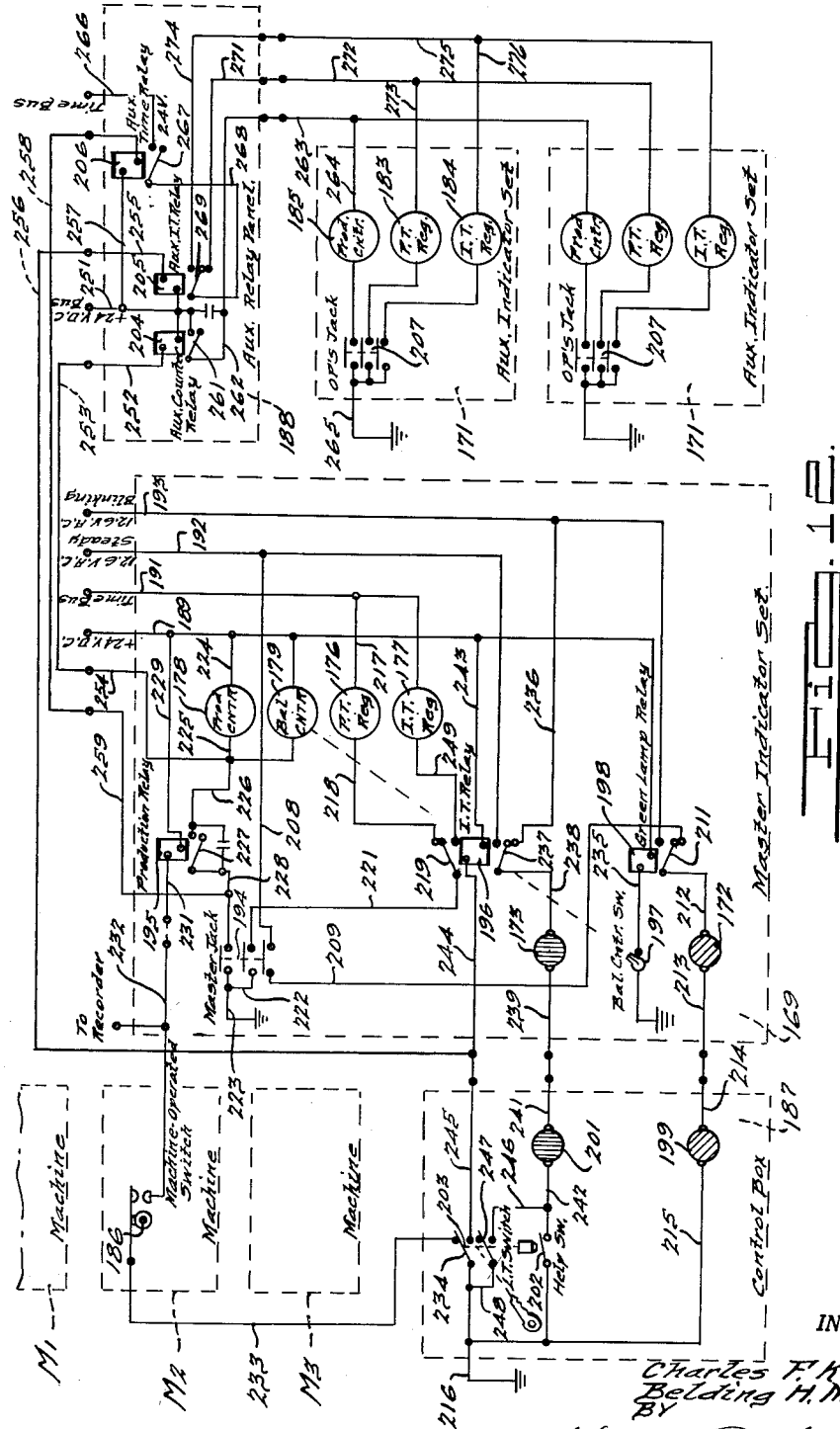

United States Patent Office 2,985,368
Patented May 23, 1961

2,985,368
PRODUCTION CONTROL SYSTEM
Charles F. Kohler, Parma, and Belding H. McCurdy, Jackson, Mich., assignors, by mesne assignments, to Hancock Telecontrol Corporation, Jackson, Mich, a corporation of Ohio
Filed May 23, 1956, Ser. No. 586,788
48 Claims. (Cl. 235—92)

This application relates to production control systems, and more particularly to arrangements for correlating at a central location information relating to the operations of a large number of machines used in the mass production of parts.

The problems involved in controlling the production of large numbers of parts and in maintaining efficiency of the labor force producing such parts on many machines have long been a source of much trouble and expense in large industrial establishments. The wide area over which such machines are usually spaced, the need for continuously gathering pay and production data, and the waste of manpower resulting from the unremedied breakdown of machine tools, are only some of the difficulties which must be adequately coped with if a factory producing large numbers of parts is to approach its optimum efficiency.

The present invention has for a general object the provision of a system which solves these problems in an effective and economical manner. More particularly, it is an object of the invention to provide an improved production control system which will provide continuous indications at a central location of the productive time of workers assigned to one or more machines in the plant, the authorized idle time of such workers, the quantity of parts produced and the balance of parts of an assigned quantity which remain to be produced, so that all necessary pay data as well as production information is available whenever needed.

It is another object to provide an improved control system of the above nature, which will enable a dispatcher at a central location to indicate at one or more machines the operators' authority to operate such machines, and in which such indication may be altered by a simple and effective arrangement in the central control room.

It is a further object to provide a production control system of this character, which includes means for indicating at both the individual machine and the central station the completion of an order to produce a specified number of parts, so that the dispatcher may take appropriate steps with respect to the machine operator and the machine itself.

It is another object to provide a production control system of this nature in which the operator at a machine may signal to the central station the need for assistance, for such causes as machine breakdown or lack of parts, so that the dispatcher may send a supervisory employee to remedy the situation and authorize non-productive or idle time for the worker if necessary. In this connection, it is an object to provide a system wherein the overall relative productive capactiy of the plant may be quickly gauged by viewing at a central location the number of operators on idle time at any particular moment.

It is a further object to provide a control system of this character in which the foreman may, by a key-controlled manipulation at a machine, indicate at the central location a change from productive to idle time of an operator, and also disconnect the parts counters so that a set-up man may work on the machine without causing false registration of parts production at the central station.

It is another object to provide a production control system of this nature in which the supervisor has control of the re-establishment of the productive time and counter circuits, thus indicating at the central station the fact that the machine has been repaired.

It is also an object to provide a production control system of this character which may be adapted for use in conjunction with a series of machines performing successive operations on a part or assembly, the system being capable of registering the productive and idle times and the parts production of workers at the various machines, whether they are assigned originally or as replacement operators in the course of a production run.

Other objects, features and advantages of the present invention will become apparent from the subsequent description, taken in conjunction with the accompanying drawings.

In the drawings:

Figure 1 is a front elevational view of a portion of a panel at the central station showing several sets of indicators, each set pertaining to an individual machine;

Figure 2 is a front elevational view of an operator's control box located at an individual machine;

Figure 3 is a schematic block diagram of the production control system, showing the general connections between the operator's control box and machine-operated switch in the plant and the indicator sets, recorder and supply circuits at the central station;

Figure 4 is a portion of a circuit diagram for an individual machine, showing the power supply, machine-operated switch, operator's control box and the connections between these and a cable plug at an indicator set in the central station;

Figure 5 is the other portion of the circuit diagram for an individual machine, to be viewed in conjunction with Figure 4, showing the connections between the cable socket at the indicator set in the central station and the switches, lamps, time registers, counters and control relays;

Figure 6 is a top view of one of the indicator sets and its associated parts;

Figure 7 is a fragmentary side elevational view taken in cross section along the line 7—7 of Figure 6 and showing the construction of the finish switch as well as the means for setting the balance counter;

Figure 8 is a side elevational view in cross section of an operator's control box taken along the line 8—8 of Figure 2 and showing the switch mountings within the box;

Figure 11 is a front elevational view of a portion of a panel at the central station showing a modified form of the invention suitable for use in conjunction with a series of machines performing successive operations on a part or assembly; and Figure 12 is a circuit diagram of the form of the invention shown in Figure 11.

Figure 9:
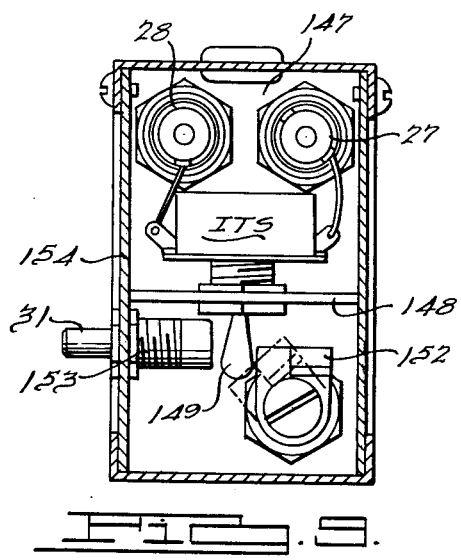
Figure 9 is a rear elevational view of the box in cross section taken along the line 9—9 of Figure 8, showing the relationship between the push button, key station and idle time switch.

*General description of system shown in Figures 1 to 10*

The production control system of this invention, as shown in Figures 1 to 10, is especially adapted for use in plants where a large number of machines such as presses are used to manufacture parts in specified quantities. It is common in such plants for the workers' wages to be computed as a function of both their productive and their idle time, with incentive pay based on production in excess of assigned quantities of parts per hour. The invention comprises a plurality of sets of indicating instruments located at a central station, these sets each being associated with an individual machine in the plant. Each indicator set at the central station comprises two indicating lamps, a plug and jack, two time registers and two parts counters or other parts registering means. At each machine in the plant, a box is located which carries two indicating lamps, a first switch controllable by the operator and a second switch which is key-operated and controllable by the foreman or other supervisory authority. Each production machine is also provided with a machine-operated switch, such as one closable upon each stroke of the machine. These elements at each machine are associated with a corresponding indicator set at the central station.

When a worker has been assigned a specified machine and an order to produce a certain number of parts, a plug is inserted in the jack of the indicator set corresponding to that machine by the dispatcher at the central station. The back of this plug may carry a rubber stamp with the operator's number, which stamp could be impressed on a card placed opposite the indicator set. Additional data concerning the job order and status of the machine may also be placed opposite the indicator set at this time. Upon insertion of the plug, one indicating lamp at the central station and one lamp at the operator's control box of the machine are energized. Each of these could be for example a green lamp which glows steadily. This will indicate to the operator at the machine that he has been authorized to manufacture the parts on this particular machine, while the central station will likewise have an indication that this machine has been assigned. At the same time, one of the time registers at the central station indicator set, called the productive time register, is energized and begins to indicate the time for which the operator will receive full production pay.

As the operator manufactures the parts, the punch press or other machine will carry out repeated movements. In the case of a punch press for example, each stroke of the ram will normally correspond to the production of a single stamping or pressed part. Switch means are so arranged on the machine that upon the production of each part both parts counters in the indicator set will be energized to indicate a change of one unit. One of the counters, termed the production counter, will be initially set at zero and will register successively higher numbers as the parts are produced. The correlation of this counter with the productive time register will enable computation of pay at any time based on hours worked and parts produced per hour. The second counter, called the balance counter, will be initially set at a number corresponding to the required order, and will register successively lower numbers, arriving at zero when the required number of parts has been produced. A switch, called the finish switch, associated with this final position of the balance counter serves to change the green lamps at both the central station and the machine from a steady glow to a blinking condition; this will indicate to both the operator and the dispatcher that the order has been completed. The dispatcher may then re-assign the operator to another machine or provide another parts order for the worker. Reassignment of the operator to another machine would be accomplished merely by removing the plug carrying the operator's number from its original position and placing it in a socket corresponding to another indicator set.

During the course of production, various circumstances may prevent an operator from continuing to produce parts in an orderly fashion. For example, the supply of material readily available to the operator may have been exhausted, or failure of the machine itself may occur. In such instances, the operator will throw the manual switch, called the help switch, located on the box adjacent his machine. This manipulation will cause the second lamp at both the central station indicator set and the machine to be energized. These lamps may be red for example, and the switch will cause their energization in a blinking manner which will be readily noticeable at the central station and may be accompanied by an audible signal. The dispatcher, noting the location of the machine and operator having trouble, may then quickly send a foreman to that location, either by means of a PA system or by some other dispatching method. The lamps are so connected that blinking of the red lamp at the machine will serve to assure the operator that his request for assistance is reaching the central station.

When the foreman arrives at the machine, he will survey the situation and determine whether the trouble may be remedied quickly or whether considerable time will be necessary to correct the difficulty. If the cause of the delay is a minor one, such as lack of material, he will correct the situation, and the operator may then throw the help switch back to its original position, de-energizing the red lamps at the central station and the machine. However, should the cause of the delay be a major one requiring considerable time to remedy, the foreman will insert a key in the box and throw the second switch, termed the idle time switch.

Key-operated movement of the idle time switch will de-energize the productive time register and energize the second register, called the idle time register. The latter will begin to indicate time during which the worker will be paid at a lower or non-productive rate. Both parts counters will simultaneously be disenabled, so that any movement of the machine during repair or set-up work will not cause operation of the counters. This movement of the idle time switch will also cause both red lamps to glow steadily instead of in a blinking manner. The appearance at the central station of a pair of steadily glowing red and green lamps side by side will indicate to the dispatcher the undesirable condition of a worker assigned to a machine which is not in production, so that appropriate steps may be taken to provide productive work for this operator. After the trouble at the machine has been remedied, the foreman will return the idle time switch and the help switch to their original positions, de-energizing the red lamps and the idle time register and re-energizing the productive time register and the parts counters, should an assignment plug still be inserted in the jack of that indicator set at the time.

Referring to the drawings, Figure 1 shows a panel 11 at the central station on which are mounted several sets of indicators of the type described above. Three of these sets are indicated generally by the brackets 12, 13 and 14. Each set comprises a green lamp 15, a red lamp 16 and an assignment jack 17, all located at the left hand portion of the set. The extreme left hand side of each indicator set may be provided with a holder for a card 18 or other indicia carrying information relative to the operator, job and machine. Positioned successively rightwardly from these elements are a productive time register 19, an idle time register 21, a production counter 22 and a balance counter 23. Reset wheels 24 are associated with the time registers and counters. Assignment plugs 25, made of conductive material and each carrying a rubber stamp with the number of an individual operator, are provided for selective placement in jacks 17. A slot 26 is provided immediately beneath the wheels of each balance counter 23 so that the latter may be preset to indicate the required number of parts to be produced, as described in detail below with respect to Figure 7. The sets of indicators may be arranged in vertical banks, with the corresponding parts of each set being in alignment.

Figure 2 illustrates the face of one of the control boxes mounted at each individual machine M. Each box has a green lamp 27 in series with lamp 15 and a red lamp 28 in series with lamp 16. Centrally located on the face of the box is the handle 29 of a manual toggle switch (the help switch) for controlling blinking operation of the red lamp. The key station 30 of a key-operated switch (the idle time switch) for controlling the blinking and steady conditions of the red lamp is provided in the lower portion of the box for use by the foreman. A normal push button 31 on the side of the control box is also provided for controlling the idle time switch.

*Schematic diagram*

Referring to the block diagram of Figure 3, this indicates schematically the arrangement of the system in a plant having several machines and a central dispatch room. The plant is indicated at 32 by the area outlined in dotted lines, while the central station or dispatch room is indicated at 33. The machines in the plant are indicated by smaller dotted areas 34, 35 and 36. Each machine is provided with an operator's control box 37 and a machine-operated switch 38. These units are connected to a terminal block 39 at the plant which in turn is connected to a similar terminal block 41 at the central station. Leading from block 41 are connections to indicator sets 42, 43 and 44 corresponding to machines 34, 35 and 36 repectively.

The power supply for the system comprises an A.C. source 45 connected through a fuse panel 46 to a D.C. supply unit 47 for the relays and counters and an A.C. supply unit 48 for the lamps. Unit 47 comprises a transformer and rectifier which, in the illustrated embodiment, feeds 24 volt D.C. through a terminal block 49 to indicator sets 42, 43 and 44. Unit 48 may comprise a transformer having a 14 volt output leading through terminal block 49 to the indicator sets. It will be understood that the indicated voltage values are intended only for illustrative purposes. A connection also leads from fuse panel 46 to the driving means for a rotary blinker unit 51 which supplies 14 volt signal current through terminal block 49 to the indicator sets.

For operating time registers 19 and 21, voltage source 45 is connected through a fuse 52 and a master time clock 53 to a time pulse unit 54, the latter being connected through terminal block 49 to the indicator sets. In this manner, time pulses are supplied every 36 seconds, or $\frac{1}{100}$ of an hour, to the productive time register 19 and idle time register 21. Master time clock 53 is so arranged that time pulses from unit 54 are produced only during normal working hours.

A graphic recorder 55 may also be provided for indicating and recording the positions of machines such as punch presses during the course of the working day. This recorder comprises a standard unit having a moving roll of paper on which lines are drawn by a plurality of pens, one pen being controlled by each machine. The detailed functions of this recorder are described below with relation to Figure 10. The signal to the graphic recorder is provided by a connection 56 leading from terminal block 41, the signal power connection being indicated at 57 and leading from signal power terminal block 49. The motor power for driving the paper roll is supplied by a connection 58 leading from fuse panel 46.

*Circuit diagrams*

Figures 4 and 5 illustrate the circuitry represented by the block diagram of Figure 3 for a single machine and indicator set. The figures are arranged to be read in conjunction with one another by matching the terminals of the cable plug in Figure 4 and the socket of Figure 5. Referring first to Figure 4, this shows the wiring at an individual machine including the machine-operated switch and the operator's control box, terminal blocks 39 and 41 at the plant and central station respectively, a cable plug for insertion into a socket on the chassis of an indicator set, and the connections from terminal block 41 and the power supply conduits to this cable plug.

The power supply comprises the A.C. input from the transformer in supply unit 47 (Figure 3) leading through a rectifier 59 and conduit 61 to a terminal A on a cable plug 62. This cable plug is associated with a particular indicator set and is located behind the bank of indicator sets so that it may be plugged into a socket attached to the chassis of its associated set. Terminals on the cable plug and chassis socket are assigned similar identifying letters for a clearer understanding of the circuit. The 14 volt steady A.C. from supply unit 48 is connected by a conduit 63 to terminal B on the cable plug, while the 14 volt blinking A.C. supply is connected by a conduit 64 to terminal C. The 24 volt D.C. time pulse supply from unit 54 is connected by a conduit 65 to terminal D of the cable plug.

Also connected to cable plug 62 are conduits leading from operator's control box 37 and machine-operated switch 38 through terminal blocks 39 and 41 at the plant and central station respectively. Green lamp 27 at control box 37 has one terminal connected to ground through a conduit 66 and its other terminal connected by a conduit 67 to terminal 39. A conduit 68 leads from terminal 39 to terminal 41 at the central station and from there a conduit 69 leads to terminal E on cable plug 62. Red lamp 28 has one terminal connected by conduits 71, 72 and 73 to terminal F on the cable plug. The other terminal of red lamp 28 is connected to a conduit 74, this conduit having contacts engageable by two parallel switches, help switch HS and one pole of idle time switch ITS. HS is a single pole-single throw toggle switch the handle of which is indicated at 29 in Figure 2, while ITS is a double pole-single throw switch closable by a key 75 insertable in key station 30 and capable of being opened by push button 31. HS when closed connects conduit 74 to ground conduit 66. Pole 76 of ITS likewise connects conduits 74 and 66 when closed. The other pole 77 of ITS when closed connects conduit 66 to a conduit 78 leading to terminal block 39, from where it is connected to terminal block 41 by a conduit 79 and to terminal G on cable plug 62 by a conduit 81. This series of conduits is used to control the relays and counters at the indicator set when ITS is moved.

Machine-operated switch 38 is a single pole-single throw switch operated by a cam coupled with the machine, and having one terminal connected to ground through a conduit 82 leading to terminal block 39. The other terminal of switch 38 is connected to terminal H on cable plug 26 by conduits 83, 84 and 85 leading through terminal blocks 39 and 41. Means are also provided for connecting switch 38 to the operating mechanism of one pen in the recorder mentioned above and discussed with respect to Figure 10. This may be done by a conduit 86 connected to terminal block 41 at the central station and leading from conduit 84 to recorder 55.

The circuits carried by the chassis of each indicator set are illustrated in Figure 5, all relays being shown in their deenergized positions in this figure. The chassis is provided with a socket 87 having terminals corresponding to those on cable plug 62. Terminal A' of the chassis socket, which receives terminal A connected to the 24 volt supply, has a conduit 88 leading to three relay coils and to the solenoids of the production and balance counters. In particular, conduit 88 is connected to an idle time relay ITR, a green lamp relay GLR, a counter relay CR, coil PC of production counter 22 and coil BC of balance counter 23. Terminal B' of chassis socket 87, which receives terminal B connected to the 14 volt steady supply, has a conduit 89 connected to pole 91 of a green light switch GLS. This is a single pole-single throw switch closable by insertion of plug 25 in jack 17. Contact 92 of GLS is connected by a conduit 93 to contact 94 of a green lamp condition switch GLCS. This is a single pole-double throw switch which is operated by GLR and determines whether green lamps 15 and 27 have steady or blinking illumination. When in its upper position shown in Figure 5, pole 95 of GLCS engages contact 94 to maintain a steady glow condition. Pole 95 is connected by a conduit 96 to green lamp 15, the other terminal of this lamp being connected by a conduit 97 to terminal E' of chassis socket 87 which receives terminal E of cable plug 62 leading to green lamp 27 on the operator's control box. It will be noted that both green lamps 15 and 27 are in series, so that the failure of either lamp will be indicated by the other. It will also be observed that the steady illumination of the green lamps is dependent upon the insertion of plug 25 in jack 17, since it is this operation which closes GLCS.

Conduit 89 leading from steady lamp supply terminal B' is also connected to a contact 98 of a red lamp condition switch RLCS controlled by ITR. This is a single pole-double throw switch which is used to select between the steady and blinking conditions of red lamps 16 and 28. When pole 99 of RLCS is in its lower position and engageable with contact 98, a steady current is supplied to red lamp 16 by a conduit 99. A conduit 101 connected to pole 99. A conduit 102 leads from the red lamp to terminal F' on socket 87, receiving terminal F on plug 62 connected to red lamp 28 at the operator's control box. Red lamps 16 and 28 are thus likewise in series, so that failure of either lamp will be noticed at the location of the other lamp. It will be observed, however, that unlike the green lamp circuit, illumination of the red lamps is not dependent upon insertion of plug 25 in jack 17. Instead, red lamp illumination is controlled by switches HS and ITS at the operator's control box.

Terminal C' in socket 87, which receives 14 volt blinking supply current through terminal C on plug 62 is connected by a conduit 103 to contacts on GLCS and RLCS which are engageable by the poles of their respective switches when a blinking condition of either the green or red lamps is desired. In particular, conduit 103 is connected to a contact 104 on RLCS and a contact 105 of GLCS engageable by poles 99 and 95 respectively. It will be noted that with their respective relays de-energized pole 95 of GLCS engages steady green contact 94 whereas pole 99 of RBS engages blinking red contact 104. When GLR is energized, blinking contact 105 will be engaged by pole 95 of GLCS and when ITR is energized steady red contact 98 will be engaged by pole 99 of RLCS.

Terminal D' of chassis socket 87, receiving plug terminal D connected to the time pulse current supply, is connected by a conduit 106 to the pole 107 of a time register selector switch TRSS controlled by ITR. This is a single pole-double throw switch which in its normal position, with ITR de-energized, has pole 107 connected to a productive time contact 108. This contact is connected by a conduit 109 to the actuating coil PT of productive time register 19. The other end of PT is connected by a conduit 111 to the pole 112 of a productive time switch PTS. This is a single pole-single throw switch which is normally open when CR is de-energized. When closed, pole 112 engages a contact 113 connected by a conduit 114 to jack 17, this conduit being grounded at 115. Jack 17 is connectable by insertion of plug 25, which is of conductive material, to a contact 116. This contact is connected by a conduit 117 to coil IT of idle time register 21. The other end of IT is connected by a conduit 118 to contact 119 of TRSS. This contact is engageable by pole 107 of TRSS when ITR is energized.

It will therefore be seen that when CR is energized (by insertion of plug 25 as discussed below), closure of PTS will cause pulsing of PT if TRSS is in its upper position shown in Figure 5, that is, with ITR de-energized. Pulses from conduit 65 will thus activate productive time register 19 to register productive time of the operator. When TRSS is shifted to its lower position by energization of ITR, pulses from conduit 65 will be disconnected from PT and pass instead through IT so that idle time register 21 registers unproductive time of the operator.

Plug contact 116 is also connected by a conduit 121 to a contact 122 of a counter relay enabling switch CRES controlled by ITR. This is a single pole-single throw switch normally closed when ITR is de-energized. Pole 123 of CRES is connected by a conduit 124 to one end of CR, the other end of which is connected to supply conduit 88 as previously described. When plug 25 is removed from jack 17, the CR circuit will be open between jack 17 and contact 116. When the plug is inserted, the circuit will be completed and CR energized. Should ITR be energized, for example by closure of ITS at the operator's control box as discussed below, CRES will open, de-energizing CR even though plug 25 remains in jack 17.

Terminal G' of socket 87, connectable by cable plug 62 to ITS, is connected by a conduit 125 to one end of ITR, the other end of which is connected to supply conduit 88 as described above. When ITS is in open position ITR will thus be de-energized, whereas closure of this switch by the foreman's key will cause energization of ITR. Likewise, opening of ITS by push button 31 will de-energize this relay.

Terminal H' of socket 87, connectable by the plug to machine-operated switch 38, is connected by a conduit 126 to a counter enabling switch CES controlled by CR. This switch consists of two single pole-single throw switches connected in parallel for increased capacity, which are normally open when CR is de-energized. Poles 127 of this switch, which are connected to conduit 126, are engageable with contacts 128 upon energization of CR. The latter contacts are connected by a conduit 129 to one end of each of the coils PC and BC of production counter 22 and balance counter 23 respectively, the other ends of these coils being connected to supply conduit 88 as described above. When CR is de-energized CES will be open, preventing energization of PC or BC. Closure of CES when CR is energized will enable PC and BC to be energized, so that the momentary closure of machine-operated switch 38 during each cycle of machine operation will operate both counters. PC will therefore operate to register an increase of one unit for each closure of switch 38, while BC will simultaneously operate to indicate a one unit decrease. A capacitor C is connected between contacts 128 of CES and contact 113 of PTS for spark suppression purposes.

Means are provided in the circuitry of Figure 5 for changing the green lamp illumination from a steady to a blinking condition when the assigned number of parts have been produced by a particular machine. This means comprises a green light relay GLR which operates GLCS and is normally de-energized. When GLR is in its de-energized condition, pole 95 of GLCS engages steady contact 94, whereas energization of GLR will cause engagement of pole 95 of this switch with blinking contact 105. Contact 105 is connected by a conduit 131 to conduit 103 leading to socket terminal C', the latter being connectable to blinking supply conduit 64. Thus, green lamps 15 and 27 will emit a blinking signal when GLR is energized.

The means for energizing GLR comprises a finish switch FS controlled by movement of balance counter 23. Movable contact 132 of FS is grounded at 133, while stationary contact 134 is connected by a conduit 135 to one end of GLR, the other end of this relay coil being connected to the power supply through conduit 88. The relationship of contact 132 to the balance counter, which is shown in detail in Figure 7, is such that FS will be open in all positions of the counter wheels, except that position which occurs immediately after zero is registered on all wheels. Immediately after the required quantity of parts has been produced, GLR will thus be energized, shifting green lamps 15 and 27 to a blinking condition. It will be noted that the blinking illumination of the green lamps occurs independently of the position of plug 25 in jack 17, since the circuit does not include GLS.

*Construction of units*

Figure 6 shows a suitable construction of one indicator set and its associated parts. The set is mounted on a chassis 136 comprising a heavy metal strip bent to accommodate the various parts. The opposite ends of chassis 136 are provided with mounting apertures 137, and the left hand portion of the chassis carries a bracket 138 for supporting the lamps and jack. Bracket 138 partially encloses the relays and wiring of the set as well as the chassis socket, the major portion of the wiring being omitted in Figure 6 for purposes of clarity of the drawing. In particular, chassis socket 87 is mounted on chassis 136, and ITR, GLR and CR are secured to the chassis alongside the socket. Lamps 15 and 16 and their associated parts are secured to the forward surface of bracket 138 so as to protrude through panel 11. An assembly 139 comprising GLS and contact 116 are also secured to the forward portion of bracket 138 along with jack 17.

The portion of chassis 136 to the right of bracket 138 is offset forwardly to provide a support for the time registers and counters, and to accommodate the wiring for these units. Productive time register 19, idle time register 21, production counter 22 and balance counter 23 are secured to chassis 136 in a row from left to right. The arrangement is such that the reset wheels 24 for these counters will project through appropriate slots in panel 11.

Figure 7 shows the manner in which FS is combined with the conventional balance counter structure to cause the blinking green signal to operate at the end of a production run. As will be understood, the balance counter comprises a plurality of wheels which are originally set at the number of parts to be produced, and which are actuated by BC each time a unit is produced. The arrangement in such conventional counters is such that after zeroes are registered on all wheels, the next impulse from BC will turn all wheels to read "9." Stationary contact 134 of FS is mounted adjacent extreme left hand wheel 141 of counter 23 by a bracket 142 secured to the counter casing by bolts 143. The contact comprises a hairpin-shaped wire secured to bracket 142 and having its free end immediately adjacent wheel 141. The wheel, which rotates counterclockwise in Figure 7 under impulses from BC and is prevented from clockwise movement by a one-way clutch mechanism, carries movable contact 132 on one side adjacent its periphery, this contact being so positioned that when the Figure "9" is visible through the counter window 144 contact 132 will engage wire 134. Since Figure "9" on the left-hand counter wheel will only appear immediately after all wheels have reached "0," FS will close when the required quantity of parts has been produced.

Figure 7 also illustrates novel means for resetting the balance counter wheels to the desired number of parts to be produced. In conventional balance counters the reset wheel 24 which is provided is only capable of "gathering up" the wheels, that is, of setting all wheels at once to zero or any other figure in which all wheels indicate the same digit. In the present instance, a stick 145 is provided having a gummed or other friction surface 146 at one end thereof. This stick may be inserted into the slot 26 which, as described above with respect to Figure 1, is provided in the casing of each balance counter 23 immediately below the wheels, and the corresponding portion of panel 11. By applying slight manual pressure to the wheel surface and drawing out the stick, the frictional surface of the stick may be used to rotate each of the counter wheels in turn to its desired indication. In this manner, it is possible to preset the balance counter for any desired total parts number.

Figures 8 and 9 show the internal construction of operator's control box 37, the front of which is illustrated in Figure 2. The box is provided with a casing having lamps 27 and 28 secured to the front plate 147 thereof. Toggle switch HS is likewise secured to the front plate of the casing, and a bracket 148 is provided within the casing for the support of ITS. The latter may also comprise a toggle switch having a downwardly projecting handle 149 operable by the key 75 or by plunger 31. In particular, key 75 is insertable in a tumbler barrel 151 of key station 30 carrying an actuating member 152 which, when rotated counterclockwise in Figure 9, will throw handle 149 to the left closing ITS. Plunger 31 is slidably mounted in a bushing 153 carried by a side wall 154 of the casing. Movement of plunger 31 to the right in Figure 9 will throw handle 149 of ITS rightwardly, moving the switch to its open position.

Recorder

Figure 10:
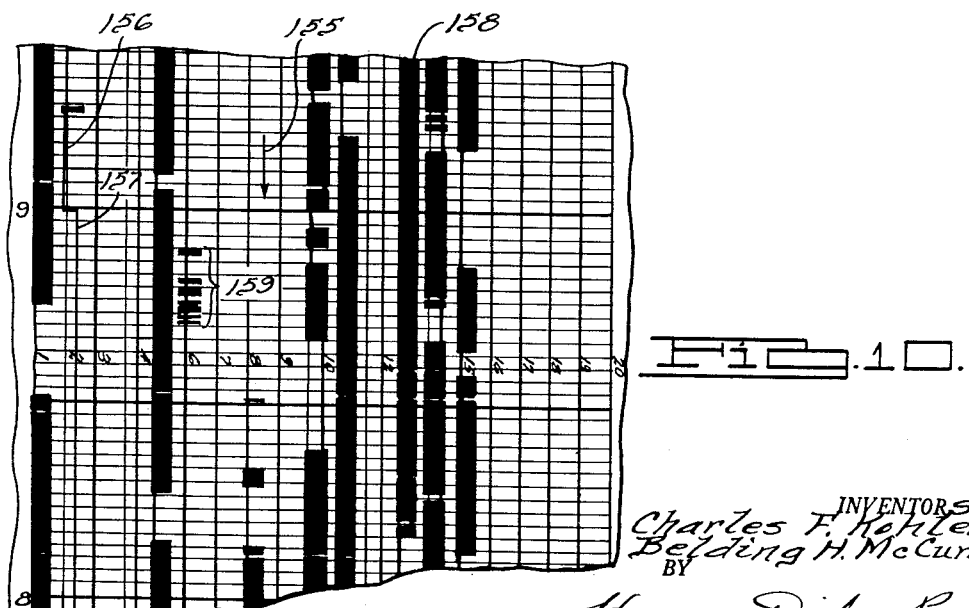
Figure 10 is a portion of a record made with the graphic recorder showing the manner in which operations of all machines are continuously recorded.

Figure 10 is a portion of a typical record made by recorder 55. The paper mounted in this recorder, which is ruled to indicate time of day, moves at a uniform rate of speed in the direction of the arrow 155 while a plurality of pens (not shown) rest thereon. Each pen is capable of limited movement in a direction transverse to the direction of movement of the paper. A solenoid (not shown) connected by conduit 86 to machine-operated switch 38, controls each pen so that the latter is responsive to the position of its corresponding machine. In the present instance, the record shows the results of connecting the pen solenoids to a group of machines of a reciprocating nature such as punch presses. A line on the left hand side of the range of movement of a pen, such as line 156, is a registration of a time period during which the machine is at the top of its stroke, whereas a line 157 on the right hand side of the range of movement of the pen would indicate that the machine head is away from its top position. A thick line extending for some length, such as that indicated at 158, would register a period during which the machine was rapidly reciprocating to produce parts. In this manner, it will be seen that a convenient and accurate visual record can be produced on a single sheet of the movements of a large number of machines, this record indicating at a glance the relative productivity of the machines and the times during which they were idle. Moreover, other operations performed on the machine, such as set-up manipulations, may be indicated by irregular shiftings of a line such as those indicated by the bracketed space 159.

Operation

Before describing the overall operation of the production control system shown in Figures 1 to 10, the following alphabetical list of circuit element abbreviations is provided for reference purposes:

BC—Coil for balance counter
CES—Counter enabling switch
CR—Counter relay
CRES—Counter relay enabling switch
FS—Finish switch
GLCS—Green lamp condition switch
GLR—Green lamp relay
GLS—Green lamp switch
HS—Help switch
IT—Coil for idle time register
ITR—Idle time relay
ITS—Idle time switch
PC—Coil for production counter
PT—Coil for productive time register
RLCS—Red lamp condition switch
TRSS—Time register selector switch Starting with an initial condition in which all circuits are open and a heretofore idle machine is to be operated by an assigned worker to produce a specified number of parts, the dispatcher in the central station will record the worker's number and other job details on a card which will be inserted in holder 18 opposite the indicator set corresponding to that machine. Productive time register 19, idle time register 21 and production counter 22 will be set to zero, while balance counter 23 will be set to the required number of parts by inserting stick 145 in slot 26 and rotating the balance counter wheels with friction surface 146 on the stick. The plug 25 corresponding to the particular worker will then be inserted in a jack 17. Assuming cable plug 62 to be properly inserted in socket 87 and master time clock 53 to be in the operating portion of its cycle, insertion of plug 25 in the jack will cause CR to be energized by the following circuit: ground conduit 115 (adjacent jack 17 in Figure 5) through jack 17, plug 25, contact 116, conduit 121, contact 122 and pole 123 of CRES conduit 124, CR, conduit 88, terminals A' and A, conduit 61 to 24 volt D.C. supply. Insertion of plug 25 will also close GLS, causing steady illumination of green lamps 15 and 27 at the central station and operator's control box respectively by means of the following circuit: 14 volt A.C. steady supply (Figure 4), conduit 63, terminals B and B', conduit 89, contacts 91 and 92 of GLS, conduit 93, contact 94 and pole 95 of GLCS, conduit 96, green lamp 15, conduit 97, terminals E' and E, conduits 69, 68 and 67, green lamp 27, and conduit 66 to ground.

Energization of CR will cause closure of CES and PTS. Closure of PTS will cause productive time register 19 to start registering productive time of the worker, by means of the following circuit: time pulse conduit 65, terminals D and D', conduit 106, pole 107 and contact 108 of TRSS, conduit 109, PT, conduit 111, pole 112 and contact 113 of PTS, and conduit 114 to ground conduit 115. Closure of CES will complete the circuits for PC and BC except for machine-operated switch 38, as follows: 24 volt D.C. supply conduit 61, terminals A and A', conduit 88, PC and BC in parallel, conduit 129, contacts 128 and poles 127 of CES, conduit 126, terminals H' and H, conduits 85, 84 and 83, and switch 38 to ground conduit 82. As the operator produces parts on the machine, switch 38 will be repeatedly closed, energizing PC and BC so that the parts produced and remaining to be produced will be indicated at the central station. Closure of switch 38 will also cause energization of the coil (not shown) which operates the pen in recorder 55 corresponding to the particular machine, the circuit being provided through conduit 86 in Figure 4.

Should the worker require assistance in order to continue production, he will throw HS on the operator's control box to its closed position. This will cause red lamps 16 and 28 at the central station and control box respectively to be illuminated in a blinking manner, through the following circuit: 14 volt A.C. blinking conduit 64, terminals C and C', conduit 103, contact 104 and pole 99 of RLCS, conduit 101, red lamp 16, conduit 102, terminals F' and F, conduits 73, 72 and 71, red lamp 28 and HS to ground conduit 66. The blinking red lamp 16 will be immediately noticeable by the dispatcher at the central station who may then instruct a foreman to proceed to the machine by means of a PA system or similar communications apparatus. Should the red lamp circuit fail for some reason, this will be immediately observed by the operator at the machine, since both red lamps 16 and 28 are in series. The operator may then take other steps to obtain assistance.

When the foreman arrives at the machine he will ascertain the type of assistance required and may then decide whether the operator should be continued on a production time basis on this or another machine, or whether a non-productive time basis for the operator should be authorized and the machine placed in idle status. If the nature of the difficulty is minor, such as a need for more material, the foreman will have the situation remedied in a short time without removing the worker from a productive time basis. In such case, as soon as the machine is again operative, either the foreman or the worker may throw HS back to its open position, thus opening the red lamp circuit. The system will then be operative in the same manner as previously.

Should the difficulty be a major one, such as breakdown of the machine which would require substantial time to repair, the foreman will insert key 75 in key station 30 of the operator's control box and will turn tumbler barrel 151 to close ITS. This action will cause grounding of the red lamp circuit independently of HS through ITS pole 76, as will be observed from an examination of Figure 4. Closure of ITS will also energize ITR through the following circuit: 24 volt supply conduit 61, terminals A and A', conduit 88, ITR, conduit 125, terminals G' and G, conduits 81, 79 and 78, and pole 77 of ITS to ground.

Energizaiton of ITR will cause shifting of RLCS and TRSS as well as opening of CRES. The shift of RLCS to its lower position will cause both red lamps 16 and 28 to be steadily instead of intermittently illuminated by means of the following circuit: 14 volt steady supply conduit 63, terminals B and B', conduit 89, contact 98 and pole 99 of RLCS, conduit 101, red lamp 16, conduit 102, terminals F' and F, conduits 73, 72 and 71, red lamp 28, conduit 74 and pole 76 of ITS to ground. Here again, the foreman would again notice any failure of this portion of the circuit because of the series relationship of the two red lamps, and such failure would be reported to the dispatcher.

The shift of TRSS to its lower position will transfer the 36 second timing pulses from PT to IT through the following circuit: time pulse supply conduit 65, terminals D and D', conduit 106, pole 107 and contact 119 of TRSS, conduit 118, IT, conduit 117, contact 116, plug 25 and jack 17 to ground conduit 115. Authorized nonproductive time for the operator will thereafter be recorded by register 21, while productive time register 19 will remain at the figure it had reached when ITS was closed.

Opening of CRES will open the circuit to CR, de-energizing this relay. This will cause both PTS and CES to open. Opening of PTS will mean that the circuit to PT will be open on both sides of this coil. Opening of CES will result in opening of the circuit to PC and BC, so that neither of these counters will register movements of the machine while it is being repaired.

At this point, both red and green lamps will be steadily illuminated at the central station and operator's box. Such illumination will indicate a condition in which a worker is assigned to an idle machine and is accumulating non-productive time, and it will normally be the goal of supervisory personnel to prevent a prolonged period during which such a situation exists. The situation could be corrected by assigning the worker to another machine capable of producing parts. In such case, plug 25 representing the worker will be removed from jack 17. This will cause opening of GLS and of the connection between contact 116 and jack 17, extinguishing all red and green lamps and de-energizing ITR. It is thus seen that the arrangement of indicating lamps at the central station will permit the relative productive efficiency of the plant to be quickly ascertained merely by noting the number of red and green lamp pairs steadily illuminated.

Assuming that the operator's assignment to the disabled machine is maintained until the machine is repaired, upon completion of the repair work either the foreman or the operator will reopen ITS by depressing push button 31 and will also reopen HS. This will cause extinguishment of red lamps 16 and 28 and will also cause ITR to be de-energized, resulting in closure of CRES and shifting of TRSS and RLCS to their previous positions. Closure of CRES will cause re-energization of CR through the circuit previously described, since plug 25 is still inserted in jack 17. CES and PTS will thus again be closed, enabling PC and BC as well as PT to operate. The upward shift of TRSS will complete the circuit to PT as previously described and open that to IT, while shift of RLCS will enable operation of the blink circuit for the red lamps. However, since ITS and HS are now both open, the red lamps will remain extinguished. The system will thus be in the same condition which it had before assistance was required. Productive time for the worker will be registered, the production and balance counters will indicate production of parts, and the steady green lamp and extinguished red lamp will indicate assignment of a worker to a productive machine.

When the worker has produced the required number of parts, the wheels of balance counter 23 will all indicate zero. Upon the next stroke of the machine, FS (Figure 5) mounted within the balance counter will close, causing the energization of GLR through the following circuit: 24 volt D.C. supply conduit 61, terminals A and A', conduit 88, GLR, conduit 135, contacts 134 and 132 of FS to ground conduit 133. Energization of GLR will cause downward shifting of GLCS, changing green lamps 15 and 27 from steady to blinking illumination through the following circuit: 14 volt blinking supply conduit 64, terminals C and C', conduits 103 and 131, contact 105 and pole 95 of GLCS, conduit 96, green lamp 15, conduit 97, terminals E' and E, conduits 69, 68 and 67 and green lamp 27 to grounded conduit 66. Since a blinking green lamp is located at the machine as well as the central station, the operator and the dispatcher will both be notified of the fact that the production run has been completed. The worker may then be assigned either another parts order at the same machine or another machine. Since the blinking green lamp circuit is independent of plug 25, the signal will continue after plug 25 has been removed until the balance counter has been reset so as to re-open FS.

Although the main purposes which the system is intended to accomplish are believed brought out by the above description, several additional uses and advantages of the arrangement might here be mentioned. The system is readily adaptable for use with modern day accounting machines using punched cards or other information storing means for computing wages, controlling inventories and performing similar accounting operations. Information made available by the time registers and counters of the various indicator sets could obviously be transferred to such accounting equipment either by means of operators or by additional electrical connections. The system thus makes available an accurate and efficient means for computation of wages, and affords a production and inventory control which is flexible in nature and is responsive to a wide range of conditions such as might arise from time to time in the plant.

Besides being of use in connection with the production of parts, the system may be utilized to convey information concerning the set-up and maintenance of machines. For example, the steady green signal lamp may be used when a set-up man has been authorized to operate a particular machine, indicating such assignment both at the machine and the central station. Similarly, the blinking red lamp alone could be used to indicate that some one other than the operator, for example a set-up or maintenance man, needs assistance at a particular machine.

The green lamp circuit, besides indicating authorization of the set-up man or operator, may also be used to actually control the power supply to the machine, so that no unauthorized persons may perform operations. This could be accomplished simply by connecting a relay 161 to conduit 93, the relay when energized closing a machine power supply circuit indicated partially at 162. If desired, an audible as well as a visual signal could be provided for the blinking lamps, this being in the form of a bell in parallel with the blinking lamps.

*System shown in Figures 11 and 12*

Figures 11 and 12 show a modified form of the production control system adapted for use in conjunction with a series of machines which perform successive operations on identical parts of assembling. With such groups of machines, the number of parts or assemblies operated upon by each machine is the same as that of every other in the group, so that it is unnecessary to provide a parts counter or balance counter for more than one machine in the series. The fact that each part or assembly must be operated upon by all machines in the group also means that failure of any one machine in the series will idle all the others. Were all the operators assigned to the machines at the beginning of the operation to remain with the same machines until the order had been completed, it would thus only be necessary to provide production time and idle time registers for one machine, since the tabulations of these registers would be valid for all operators. In practice however there are normally shifts in the working force during the course of production, and it is thus essential that means be provided for registering the productive and idle times of replacement workers assigned to machines in the group after the job has been started. The signal lamps indicating the productive status of the machines and the need for assistance (the red and green lamps of the previous embodiment) are only necessary for one machine in the group, since as stated previously the breakdown of any one machine will mean that all are incapacitated.

Referring more particularly to Fig. 11, a portion 164 of the central station panel is shown, this panel carrying the various sub-assemblies which comprise the central station portion of the system. At one side a dummy panel 165 is shown, this panel having no electrical connection with the system but being provided for the purpose of identifying those operators who have been originally assigned to the machines in the series at the start of a production run. Panel 165 is provided with several rows of apertures 166 within which may be inserted plugs 167 representing the various operators. As in the previous embodiment, these plugs may carry a rubber stamp with the operator's number, and legends bearing these numbers or other indicia may be mounted below the apertures, as indicated at 168. It will be understood that other means for recording the numbers of operators originally assigned to the machine group may be utilized, although as noted below the illustrated arrangement has been found convenient for use in conjunction with the other portions of the system.

At another portion of panel 164 is located a master indicator set 169 and a plurality of auxiliary indicator sets 171. Set 169 is provided with a green lamp 172, a red lamp 173 and a jack 174, all located at the left hand portion of the set along with a holder for a card 175 carrying information relating to the job. Positioned to the right of these elements are a productive time register 176, an idle time register 177, a production counter 178 and a balance counter 179, together with corresponding reset wheels. The registers, counters and signal lamps are connected with any one machine in the series as described in detail below, and perform functions similar to those of their counterparts in the previous embodiment.

The purpose of auxiliary indicator sets 171 is to register the parts produced and the productive and idle times of operators who are not originally assigned to machines in the series but are assigned later as replacements or substitutes for other workers. Obviously, the time and production data registered on master indicator set 169 would not be useful with respect to such later-assigned workers. However, once these workers are assigned to the production line, data should accumulate with respect to them in the same manner that it accumulates with respect to the other workers on the line. The registers on these auxiliary panels may therefore receive their signals through the same means provided for the master panel, provision being made for selective enablement of the auxiliary panels and for disenablement of these panels whenever the master panel is disenabled. It is furthermore not necessary to provide an auxiliary panel for each individual machine in the production line, but only sufficient panels to accommodate the number of substitute or replacement workers which might be expected during a production run.

Each auxiliary indicator set 171 comprises a jack 181, a holder for a card 182 with information pertaining to the worker, a productive time register 183, an idle time register 184 and a production counter 185. For reasons mentioned above, it is unnecessary to provide the red and green signal lamps on the auxiliary indicator sets, and balance counters are also superfluous in view of the presence of counter 179 on master indicator set 169.

Referring now to the circuit diagram shown in Figure 12 $M_1$, $M_2$ and $M_3$ indicate schematically a series of machines in a production line, these machines being adjacent each other and performing successive operations on identical parts or assemblies which pass from one machine to the other. On one such machine, for example machine $M_2$, a machine-operated switch 186 is provided, this switch closing once during each cycle of the machine. A control box 187 is also mounted on machine $M_2$, and units 186 and 187 are connected to master indicator set 169 located at the central station. Auxiliary indicator sets 171 and an auxiliary relay panel 188 carrying relays which interconnect the master and auxiliary indicator sets are also located at the central station.

Master indicator set 169 is provided with supply conduits including a 24-volt D.C. conduit 189 for the counters and relays, a pulsating time conduit 191 for the production and idle time registers, a low voltage conduit 192 for steady lamp illumination, and a conduit 193 for blinking illumination. An assignment plug 194 is provided for insertion in master jack 174, this plug not carrying identification for any particular operator. The chassis of master indicator set 169 also carries a production relay 195, an idle time relay 196, a balance counter switch 197 and a green lamp relay 198 operated by switch 197.

Control box 187 is provided with a green lamp 199, a red lamp 201, a help switch 202 and an idle time switch 203. The idle time switch, instead of being a double pole-single throw switch as in the previous embodiment, is here shown as a double pole double throw switch, with the additional function of disenabling machine-operated switch 186 when the foreman authorizes idle time for the machine. The manner in which this is accomplished is described in detail below. Auxiliary relay panel 188 carries three relays, an auxiliary counter relay 204, an auxiliary idle time relay 205 and an auxiliary timer enabling relay 206. These relays are connected with elements of master indicator set 169 and control productive time registers 183, idle time registers 184 and production counters 185 on auxiliary indicator sets 171. Plugs 207 are provided for operators' jacks 181 in the auxiliary sets, these plugs carrying identifying symbols for the replacement operators. Preferably, plugs 167 for dummy panel 165 and plugs 207 for the auxiliary panels are of identical construction so that they may be used at either location depending upon whether a particular operator is originally assigned or later assigned to a machine.

*Operation of embodiment of Figures 11 and 12*

The cooperation of the system elements enumerated above may perhaps best be understood by describing the events during a typical production operation utilizing the novel control system. Assuming an initial condition in which the plugs are removed from both the master and auxiliary indicator sets as well as the dummy panel, upon the assignment of operators to machines $M_1$, $M_2$ and $M_3$ appropriate plugs 167 will be inserted in panel 165 identifying these workers. Assignment plug 194 will be inserted in master jack 174 and an indicia card 175 will be mounted on the face of the master indicator set with a description of the job and other appropriate data. Productive time register 176, idle time register 177 and production counter 178 will both be set at zero, balance counter 179 being set at the number of units to be produced during the production run.

Insertion of plug 194 will cause green lamps 172 and 199, at the master indicator set and control box respectively, to be steadily illuminated through the following circuit: supply conduit 192, conduit 208, plug 194, conduit 209, pole 211 of green lamp relay 198, conduit 212, green lamp 172, conduits 213 and 214, green lamp 199 and conduit 215 to ground conduit 216. The circuit to productive time register 176 will also be closed by insertion of plug 194, through the following circuit: supply conduit 191, conduit 217, productive time register 176, conduit 218, pole 219 of idle time relay 196, conduit 221, plug 194 and conduit 222 to ground conduit 223. The green lamps and productive time register will thus function on the master indicator set in the same manner as their analogous parts in the previous embodiment.

Insertion of plug 194 will serve to enable or partially close the following circuit through production counter 178: supply conduit 189, conduit 224, production counter 178, conduit 225, conduit 226, pole 227 of production relay 195 (this pole being disengaged from its contact except as indicated below), conduit 228 and plug 194 to ground conduit 223. Upon operation of machine $M_2$, switch 186 will be intermittently closed, thus completing a circuit through production relay 195 as follows: supply conduit 189, conduit 229, production relay 195, conduits 231 and 232, switch 186, conduit 233 and pole 234 of idle time switch 203 to ground condit 216. Intermittent energization of production relay 195 will cause pole 227 to engage its contact, thus operating the production counter. When the production run has been completed, the return of balance counter 179 to its zero position will close balance counter switch 197, causing energization of green lamp relay 198 through the following circuit: supply conduit 189, green lamp relay 198, conduit 235 and balance counter switch 197 to ground. Energization of relay 198 will cause pole 211 to shift into engagement with its other contact, thus closing the blinking circuit from supply conduit 193 through the same green lamp circuit previously described.

Should help be needed at any machine during the production run, an operator may close help switch 202 on control box 187 at machine $M_2$. It will be understood that since the machines will normally be adjacent each other, the location of help switch 202 on machine $M_2$ will not inconvenience the operators. Closure of switch 202 will cause blinking operation of the red lamps through the following circuit: supply circuit 193, conduit 236, pole 237 of idle time relay 196, conduit 238, red lamp 173, conduits 239 and 241, red lamp 201, conduit 242, help switch 202, and conduit 215 to ground conduit 216.

Should the nature of the trouble be such that idle time should be authorized, the foreman will shift idle time switch 203 by means of a key. Shifting of idle time switch 203 will open the circuit to production relay 195, since pole 234 will be moved away from its connection with conduit 233. Thus, no further registration of parts production will be made. The shifting of idle time switch 203 will also cause energization of idle time relay 196 through the following circuit: supply conduit 189, conduit 243, idle time relay 196, conduits 244 and 245, and pole 234 of idle time switch 203 to ground conduit 216.

Energization of idle time relay 196 will cause the red lamps to change from a blinking to a steadily glowing condition, through the following circuit: supply conduit 192, pole 237 of idle time relay 196, conduit 238, red lamp 173, conduits 239 and 241, red lamp 201, conduits 242 and 246, pole 247 of idle time switch 203, and conduit 248 to ground conduit 216. Energization of idle time relay 196 will also cause opening of the productive time register circuit and closure of the idle time register circuit, since pole 219 will be shifted from connection with conduit 218 to connection with a conduit 249. When a fault of production stoppages has been corrected, idle time switch 203 may be returned to its original position by means of its push button, thus restoring the circuit elements to their previous condition. Master indicator set 169 will thus serve for all the operators originally assigned to the series of machines the samet functions that each indicator set in the previous embodiment performed for the operator assigned to an individual machine.

Operation of the master indicator set in the foregoing manner will also serve to control the operation of the relays mounted on auxiliary relay panel 188, although operation of these relays will have no effect as long as the auxiliary indicator sets remain deenergized. Auxiliary counter relay 204 will be intermittently energized simultaneously with production counter 178, through the following circuit: supply conduit 251 on the auxiliary relay panel, auxiliary counter relay 204, conduits 252, 253, 254 and 226, pole 227 of production relay 195, conduit 228, and plug 194 to ground conduit 223. Auxiliary idle time relay 205 will be energized simultaneously with idle time relay 196 through the following circuit: supply conduit 251, auxiliary idle time relay 205, conduits 255, 256 and 245, and pole 234 of idle time switch 203 to ground conduit 216. Auxiliary time relay 206 will be energized upon insertion of plug 194 into the master jack, through the following circuit: supply condit 251, conduit 257, auxiliary time relay 206, conduits 258, 259 and 228, and plug 194 to ground conduit 223.

Should it become necessary to replace an operator at, say, machine $M_3$, the data pertaining to the replaced operator at the time of his replacement will be read off from master indicator set 169, and the plug representing that operator removed from dummy panel 165. A plug 207 corresponding to the new operator will be inserted in jack 181 on one of the auxiliary indicator sets 171, the productive time register 183, idle time register 184 and production counter 185 of this auxiliary indicator set being set at zero. Insertion of plug 207 will cause production counter 185 to commence a count of the parts produced by the new operator through the following circuit: supply conduit 251, pole 261 of auxiliary counter relay 204, conduits 262, 263 and 264, production counter 185 and plug 207 to ground conduit 265. Productive time register 183 will commence an indication of the new operator's productive time through the following circuit: auxiliary time bus 266, pole 267 of auxiliary time relay 206, conduit 268, pole 269 of auxiliary time relay 205, conduits 271, 272 and 273, productive time register 183 and plug 207 to ground conduit 265. Should idle time be authorized while the new operator is at the machine, energization of auxiliary idle time relay 205 will cause disenablement of productive time register 183 and closure of the circuit to idle time register 184 because of the shift of pole 269 of auxiliary idle time relay 205 from connection with conduit 271 to connection with a conduit 274 leading through conduits 275 and 276 to idle time register 184.

The disenablement of counters 178 and 179 of the master indicator set when idle time switch 203 is shifted will be reflected in auxiliary production counter 185, which will not register parts production as long as the circuit through machine-operated switch 186 is opened. The auxiliary indicator sets will thus register the necessary data for new operators assigned to machines in the series, without interfering with the accumulation of data for originally assigned operators. As each new operator is assigned to a machine, another auxiliary indicator set 171 will be activated. Should a replacement operator be himself replaced, the data pertaining to the replaced operator may be noted from the auxiliary indicator set and the counter and registers on that set returned to zero before a plug 207 corresponding to the new operator is inserted. Should plug 194 of master jack 174 be removed, the de-energization of relays on the auxiliary relay panel will cause simultaneous disenablement of all auxiliary indicator sets as well as the master set.

While it will be apparent that the preferred embodiments of the invention disclosed are well calculated to fullfill the objects above stated, it will be appreciated that the invention is susceptible to modification, variation and change without departing from the proper scope or fair meaning of the subjoined claims.

What is claimed is:

1. In a production control system, a central station, a first register at said station for registering the productive time of an operator assigned to a machine, time impulse signal means for actuating said first register independently of the operational status of said machine, a second register at said station adjacent said first register for registering the number of parts operated upon by said machine, a third register adjacent said first two registers for registering the balance of parts to be operated upon by said machine, machine-operated signal means for actuating said second and third registers, unitary selective means at said station movable between a first position simultaneously disconnecting and a second position simultaneously connecting said registers and their respective signal means, a switch at said machine manually movable between first and second positions, a first visual signal adjacent said registers actuatable in response to movement of said switch to its second position, and a second visual signal at said machine actuatable in response to movement of said unitary selective means to its second position.

2. In a production control system, a central station, a first register at said station for registering the productive time of an operator assigned to a machine, time impulse signal means for actuating said first register independently of the operational status of said machine, a second register at said station adjacent said first register for registering the number of parts operated upon by said machine, machine-operated signal means for actuating said second register, first selective means at said station movable between a first position disconnecting and a second position connecting said registers and their respective signal means, and second selective means controllable from a position adjacent said machine and movable between a normal first position and a second position disconnecting said registers and their respective signal means independently of the position of said first selective means.

3. The combination according to claim 2, further provided with a third register at said central station for registering the idle time of an operator assigned to said machine, and means responsive to movement of both of said selective means to their second positions for connecting said time impulse signal means to said third register independently of the operational status of said machine.

4. In a production control system, a central station, a register at said station for registering the productive time of an operator assigned to a machine, means at said station for controlling the activation of said register in accordance with the assignment of an operator to said machine, a second register at said station for registering idle time of an operator assigned to said machine, means at said machine movable between a first position in which the productive register for such machine is activated and the idle register is deactivated, and a second position in which the productive register is de-activated and the idle register activated, said last-mentioned means being operable between said positions independently of said productive register control means at the central station, said productive register control means being movable to a position deactivating said registers and disenabling the means at said machine, and means at said central station responsive to operation of said machine for registering the number of parts operated upon by said machine, whereby the productive and idle times and the number of parts worked on by said operator may be correlated.

5. In a production control system, a central station, productive and idle time registers at said central station corresponding to a machine, first control means at said central station movable between a first position in which both registers are deactivated and a second position in which said productive register is activated, and second control means manually movable when said first control means is in its second position between a first position in which said productive register is activated and a second position in which said idle register is activated.

6. The combination according to claim 5, said second control means being located adjacent the machine.

7. In a production control system, a central station, productive and idle time registers at said central station corresponding to a machine, manual control means at said central station for said registers, said control means being movable between a first position in which both registers are de-activated and a second position in which the productive register is activated, and machine-located control means for said registers, said machine-located control means being key-operable from a first position in which the registers are left under the control of said central station control means to a second position in which the productive register is de-activated and the idle register activated, both of said registers being de-activated when said central station control means is in its first position independently of the position of said machine-located control means.

8. The combination according to claim 7, further provided with signal means at said central station and at said machine, said signal means being simultaneously operable at said central station and said machine to a first condition indicating the activation of said productive register and the de-activation of said idle register, a second condition indicating the activation of said idle register and the de-activation of said productive register, and a third condition indicating the de-activation of both registers.

9. The combination according to claim 8, said signal means comprising a first lamp at said central station, a first lamp at said machine in series therewith, a second lamp at said central station, and a second lamp at said machine in series with said second station lamp, means responsive to movement of said central station control means to its second position for causing illumination of said first lamp at said central station and machine, and means responsive to movement of said machine-located control means to its second position for causing illumination of said second lamp at said central station and machine.

10. The combination according to claim 7, the control means for said time registers at said central station comprising a jack, a plug manually insertable in said jack, and operator-identifying means carried by said plug.

11. The combination according to claim 7, said machine-located control means comprising a switch, means responsive to key operation for moving said switch from its first to its second position, and means responsive to finger pressure for returning said switch to its first position.

12. In a production control system, a central station, a productive and an idle time register at said central station corresponding to a machine, manual control means at said central station for said registers, said control means being movable between a first position in which both registers are de-activated and a second position in which the productive register is activated, machine-located control means for said registers, said machine-located control means being key-operable from a first position in which the registers are left under the control of said first control means to a second position in which the productive register is de-activated and the idle register activated, both of said registers being de-activated when said central station control means is in its first position independently of the position of said machine-located control means, and means at said central station responsive to operation of said machine to register the number of parts operated upon by the machine, whereby the productive and idle times and the number of parts worked on by the operator may be correlated.

13. The combination according to claim 12, further provided with a balance counter at said central station, means for setting said balance counter to the required number of parts at the beginning of an operation, and means responsive to the movement of said balance counter for simultaneously indicating the completion of an operation at said central station and said machine.

14. The combination according to claim 13, said means for indicating the end of an operation comprising a switch movable by said balance counter, and signals at said central station and said machine responsive to movement of said switch.

15. In a production control system, a central station, a help signal at said central station corresponding to a machine, said signal being operable to a first condition indicating that no help is needed at said machine, a second condition indicating that help is needed, and a third condition indicating the authorization of idle time for the operator assigned to said machine, first control means at said machine movable between two positions for placing said signal in either of its first or second condition, said first control means being manually movable by the machine operator to either of its positions, second control means at said machine, a key-operated actuator for moving said second control means from a first position to a second position in which said signal is placed in its third condition independently of the position of said first control means, and a manual actuator for returning said second control means to its first position, said signal being controllable by said first control means when said second control means is in said first position.

16. The combination according to claim 15, further provided with a signal at said machine corresponding to the signal at said central station, said signals being operable simultaneously, whereby failure of said central station signal will be ascertainable at the corresponding machine.

17. The combination according to claim 15, further provided with a productive time register and an idle time register at said central station corresponding to said machine, means at said central station for enabling operation of said registers and for causing activation of said productive register when said second control means is in its first position, and means responsive to movement of said second control means to its second position for causing said idle register to be activated and said productive register de-activated.

18. The combination according to claim 17, said help signal being operable to its first or second conditions independently of said central station means for enabling register operation.

19. The combination according to claim 15, further provided with means at said central station responsive to machine operation for counting parts operated upon by said machine, and means responsive to movement of said second control means to its second position for disenabling said counting means.

20. The combination according to claim 15, said signal comprising a lamp, said lamp being extinguished when said first and second control means are each in their first position, said lamp providing a blinking signal when said first control means is in its second position and said second control means is in its first position, said lamp providing a steady signal when said second control means is in its second position independently of the position of said first control means.

21. In a production control system, a central station, an indicator set at said central station corresponding to a machine, said set comprising an assignment plug and jack, first and second lamps, a productive time register, an idle time register, a production counter and a balance counter, a control set at said machine comprising first and second lamps in series respectively with the first and second lamps at said central station, a help switch manually operable between two positions, and an idle time switch key-operable from a first to a second position and manually returnable to its first position, means responsive to insertion of said plug in said jack for steadily illuminating said first lamps at said central station and machine, activating said productive time register and enabling operation of said production and balance counters, means responsive to operation of said machine in production for activating said production and balance counters to register such production, means responsive to movement of said help switch from its first to its second position for causing blinking illumination of said second lamps at said central station and said machine, means responsive to movement of said idle time switch to its second position for causing steady illumination of said second lamps, de-activating said productive time register and counters and activating said idle time counter, means responsive to return of said help and idle time switches to their first positions for extinguishing said second lamps, return of said idle time switch to its first position further causing re-activation of said productive time register and said counters and de-activation of said idle time register, and means responsive to removal of said plug from said jack for de-activating both of said time registers and said counters independently of the positions of said switches.

22. The combination according to claim 21, further provided with a finish switch on said balance counter, and means responsive to movement of said switch to its closed position for causing blinking operation of said first lamps independently of the position of said plug.

23. The combination according to claim 21, further provided with means adjacent said indicator set at said central station for removably carrying information pertinent to said machine.

24. In a production control system for a plurality of machines, a central station, a plurality of registers at said station for registering the productive time of each operator assigned to a machine, means at said station for controlling the activation of each of said registers in accordance with the assignment of operators to said machines, a plurality of registers at said station for registering idle time of each operator assigned to a machine, time impulse signal means for activating said productive time and idle time registers independently of the operative status of their corresponding machines, means at each machine movable between a first position in which the productive time register for such machine is activated and the idle time register is de-activated, and a second position in which the productive time register is de-activated and the idle time register activated, said last-mentioned means being operable between said positions independently of said productive time register control means at the central station, said productive register control means being movable to a position deactivating said registers and disenabling the means at said machine, and means at said central station responsive to operation of said machines to register the number of parts operated upon by each machine, whereby the productive and idle times and the number of parts worked on by each operator may be correlated.

25. In a production control system for a plurality of machines, a central station, a plurality of pairs of time registers at said central station for said machines, each pair comprising a productive and an idle time register for its corresponding machine, manually movable control means at said central station for each of said pairs of registers, said means being movable between a first position in which both registers are de-activated and a second position in which the productive register is activated, and machine-located control means for said pairs of time registers, each of said machine-located control means being key-operable from a first position in which the pair of registers is left under the control of said central station control means to a second position in which the productive time register is de-activated and the idle time register activated, both of said time registers being de-activated when said central station control means is in its first position independently of the position of said machine-located control means.

26. In a production control system for a plurality of machines, a central station, a plurality of pairs of time registers at said central station for said machines, each pair comprising a productive and an idle time register for its corresponding machine, manually movable control means at said central station for each of said pairs of registers, said control means being movable between a first position in which both registers are de-activated and a second position in which the productive register is activated, machine-located control means for each of said pairs of time registers, each of said machine-located control means being key-operable from a first position in which the pair of registers is left under the control of said first control means to a second position in which the productive time register is de-activated and the idle time register activated, both of said time registers being de-activated when said central station control means is in its first position independently of the position of said machine-located control means, and a plurality of counters at said central station responsive to operation of said machines to register the number of parts operated upon by each machine, whereby the productive and idle times and the number of parts worked on by each operator may be correlated.

27. In a production control system for a plurality of machines, a central station, a plurality of help signals at said central station corresponding to said machines, said signals being operable between a first condition indicating that no help is needed at a given machine, a second condition indicating that help is needed, and a third condition indicating the authorization of idle time for the operator assigned to said machine, first control means at each of said machines movable between two positions for placing its corresponding signal in either its first or second condition, said first control means being manually movable by the machine operator to either of its positions, second control means at each machine, a key-operated actuator for moving said second control means from a first position to a second position in which said signal is placed in its third condition independently of the position of said first control means, and a manual actuator for returning said second control means to its first position, said signal being controllable by said first control means when said second control means is in said first position.

28. In a production control system for a series of machines performing successive operations on parts, a central station, a master productive time register for registering the productive time of operators originally assigned to said machines, first control means at said station for controlling the activation of said register in accordance with said original assignments, a master idle time register for registering the idle time of said originally assigned operators, second control means at one of said machines for disenabling said productive register and enabling said idle register, auxiliary productive and idle time registers for registering the productive and idle times respectively of a replacement operator assigned to one of said machines after said originally assigned operators, and a selectively operable connection between said auxiliary registers and said first and second control means for the master registers, whereby said auxiliary registers may be activated in accordance with the assignment of said replacement operator and the condition of said master registers.

29. The combination according to claim 28, further provided with a master parts register responsive to operation of one of said machines for registering the number of parts produced by said series of machines, an auxiliary parts register, and means for operating said auxiliary parts register simultaneously with said master parts register, said last-mentioned means being selectively operable in accordance with the assignment of said replacement operator.

30. The combination according to claim 28, further provided with a help signal at said central station, and means at said one machine for activating said help signal to indicate the need for assistance at any of said machines.

31. The combination according to claim 28, further provided with a signal at said central station for indicating an idle condition for said machines, and means at said one machine operable simultaneously with said second control means for activating said signal.

32. The combination according to claim 28, further provided with a signal lamp at said central station, a manual help switch at said one machine operable to cause blinking illumination of said signal lamp to indicate the need for assistance at any of said machines, a switch at said one machine operable to cause steady illumination of said signal lamp to indicate an idle condition for said machines, and key-operated means for causing simultaneous actuation of said second control means and said switch.

33. The combination according to claim 28, said selectively operable connection for the auxiliary registers comprising a jack adapted to receive a plug, a dummy panel adjacent said registers for identifying operators originally assigned to said machines, said dummy panel having a plurality of apertures, and a plurality of plugs corresponding to available operators, said plugs being adapted to fit said apertures or said jack.

34. In a production control system for a series of machines performing successive operations on parts, a central station, a master indicator set at said central station, said set comprising an assignment plug and jack, first and second lamps, a productive time register, an idle time register, a production counter and a balance counter, at least one auxiliary indicator set at said central station, said auxiliary set comprising a jack, a productive time register, an idle time register and a production counter, a dummy panel at said central station, said dummy panel being provided with a plurality of apertures, a plurality of operator plugs corresponding to available operators, said operator plugs being capable of insertion in either said dummy panel apertures or said auxiliary set jack, a control set at one of said machines comprising first and second lamps in series respectively with the first and second lamps of said master indicator set, a help switch manually operable between first and second positions, and an idle time switch key-operable from a first to a second position and manually returnable to its first position, means responsive to insertion of said assignment plug in its jack for steadily illuminating said first lamps, activating said master productive time register and enabling operation of said master production and balance counters, means responsive to operation of said one machine in production for actuating said master production and balance counters to register said production, means responsive to movement of said help switch from its first to its second position for causing blinking illumination of said second lamps, means responsive to movement of said idle time switch to its second position for causing steady illumination of said second lamps, disenabling said master productive time register and counters and activating said master idle time counter, means responsive to return of said help and idle time switches to their first positions for extinguishing said second lamps, return of said idle time switch to its first position further causing reactivation of said master productive time register and counters and disenablement of said master idle time register, means responsive to insertion of one of said operator plugs in said auxiliary jack for causing coincident operation of said auxiliary registers and counter and their corresponding master registers and counter, and means responsive to removal of said assignment plug from its jack for extinguishing both of said first and second lamps and disenabling said master and auxiliary registers and counters independently of the positions of said switches and said one operator plug.

35. In a production control system, a central station, a help signal at said central station corresponding to a machine, said signal being operable between a first condition indicating that no help is needed at said machine, a second condition indicating that help is needed, and a third condition indicating the authorization of idle time for the operator assigned to said machine, first control means at said machine movable between two positions for placing said signal in either its first or second condition, and second control means at said machine for placing said signal in its third condition independently of said first control means.

36. In a production control system for a plurality of machines, a central station, a plurality of pairs of time registers at said central station for said machines, each pair comprising a productive and an idle time register for its corresponding machine, manually movable control means at said central station for each of said pairs of registers, said control means being movable between a first position in which both registers are deactivated and a second position in which the productive register is activated, machine-located control means for each of said pairs of time registers and operable to activate the idle time register and deactivate the productive time register, and a plurality of counters at said central station responsive to the operation of said machines to register the number of parts operated upon by each machine, whereby the productive and idle times and the number of parts worked on by each operator may be correlated.

37. The combination according to claim 36, further provided with means adjacent each of said machines for manually shifting said machine-located control means between a first position in which the productive time register and parts counter are activated and the idle time register is deactivated, and a second position in which said idle time register is activated and the productive time register and parts counter deactivated.

38. In a production control system, a central station, a first register at said station for registering the productive time of an operator assigned to a machine, a second register at said station for registering the idle time of an operator assigned to said machine, time impulse signal means for actuating said registers independently of the operational status of said machine, a jack at said station, a plug insertable in said jack and carrying operator-identifying indicia, means responsive to insertion of said plug for connecting said time impulse signal means to said productive time register, selective means at said machine for deactivating said productive time register and activating said idle time register after said plug is inserted, and means responsive to removal of said plug from the jack for disenabling both registers.

39. In a production control system for a plurality of machines, a central station, a plurality of sets of productive and idle time registers at said central station corresponding to said machines, first control means at said central station for each of said sets movable between a first position in which both registers are de-activated and a second position in which the productive register is activated, and second control means for each set manually movable when its corresponding first control means is in its second position between a first position in which the productive register is activated and a second position in which the idle register is activated.

40. The combination according to claim 39, each of said second control means being located at its corresponding machine.

41. The combination according to claim 39, further provided with time impulse signal means for actuating said registers independently of the operational status of their corresponding machines.

42. The combination according to claim 39, each of said second control means being located at its corresponding machine, and time impulse signal means for actuating said registers independently of the operational status of their corresponding machines.

43. In a production control system, a central station, a register at said station for registering the productive time of an operator assigned to a machine, means at said station for controlling the activation of said register in accordance with the assignment of an operator to said machine, said means comprising a receptacle adjacent said register and a plurality of portable indicia-carrying members any one of which is insertable in said receptacle, a second register at said station for registering idle time of an operator assigned to said machine, means at said machine movable between a first position in which the productive register for such machine is activated and the idle register is de-activated, and a second position in which the productive register is de-activated and the idle register activated, said last-mentioned means being operable between said positions independently of said productive register control means at the central station, said productive register control means being movable to a position de-activating said registers and disenabling the means at said machine, and means at said central station responsive to operation of said machine for registering the number of parts operated upon by said machine, whereby the productive and idle times and the number of parts worked on by said operator may be correlated.

44. In a production control system, a central station, a register at said station for registering the productive time of an operator assigned to a machine, means at said station for controlling the activation of said register in accordance with the assignment of an operator to said machine, a second register at said station for registering idle time of an operator assigned to said machine, means at said machine movable between a first position in which the productive register for such machine is activated and the idle register is deactivated, and a second position in which the productive register is de-activated and the idle register activated, said last-mentioned means being operable between said positions independently of said productive register control means at the central station, said productive register control means being movable to a position deactivating said registers and disenabling the means at said machine, a portable key, said last-mentioned means being movable to at least one of its positions only in response to insertion of said key, and means at said central station responsive to operation of said machine for registering the number of parts operated upon by said machine, whereby the productive and idle times and the number of parts worked on by said operator may be correlated.

45. In a production control system, a central station, productive and idle time register at said central station corresponding to a machine, first control means at said central station movable between a first position in which both registers are deactivated and a second position in which said productive register is activated, said first control means comprising a receptacle adjacent said registers and a plurality of portable indicia-carrying members any one of which is insertable in said receptacle to form said second position, and second control means manually movable when said first control means is in its second position between a first position in which said productive register is activated and a second position in which said idle register is activated.

46. In a production control system for a plurality of machines, a central station, a plurality of pairs of time registers at said central station for said machines, each pair comprising a productive and an idle time register for its corresponding machine, manually movable control means at said central station for each of said pairs of registers, said means being movable between a first position in which both registers are de-activated and a second position in which the productive register is activated, said means comprising a receptacle adjacent each pair of registers and a plurality of portable indicia-carrying members any one of which is insertable in any one of said receptacles to form said second position, and machine-located control means for said pairs of time registers, each of said machine-located control means being key-operable from a first position in which the pair of registers is left under the control of said central station control means to a second position in which the productive time register is de-activated and the idle time register activated, both of said time registers being de-activated when said central station control means is in its first position independently of the position of said machine-located control means.

47. In a production control system for a plurality of machines in which more than one operator may be associated with each machine, a central station, a first register group at said central station for each machine, each of said first register groups comprising a time registering the productive time of an operator associated with the corresponding machine and a parts register to register the number of parts produced by such machine, time impulse signal means for actuating said time registers independently of the operative status of their machines, signal means responsive to operation of said machines for actuating said parts registers, selectively operable means adjacent each of said first register groups for simultaneously connecting the registers thereof with their respective signal means in accordance with the association of a first operator with the corresponding machine, at least one additional register group adjacent each first register group, said additional register groups each comprising a time register and a parts register, and additional selectively operable means adjacent each additional register group for simultaneously connecting the registers thereof with the respective signal means of the adjacent first register group in accordance with the association of additional operators with the corresponding machine.

48. In a production control system, a central station, a first register at said station for registering the productive time of an operator assigned to a machine, time impulse signal means for actuating said first register independently of the operational status of said machine, a second register at said station adjacent said first register for registering the number of parts operated upon by said machine, machine-operated signal means for actuating said second register, a receptacle adjacent said registers with an electrical switch having a first condition simultaneously disconnecting and a second condition simultaneously connecting said registers and their respective signal means, and a plurality of portable indicia-carrying members any one of which is insertable in said receptacle to cause said switch to assume its second condition.

References Cited in the file of this patent

UNITED STATES PATENTS

| | | |
|---|---|---|
| 1,263,571 | Larrabee | Apr. 23, 1918 |
| 1,284,430 | Norton | Nov. 12, 1918 |
| 1,335,596 | Morrison | Mar. 30, 1920 |
| 1,713,276 | Goeckler | May 14, 1929 |
| 1,746,638 | Cooney | Feb. 11, 1930 |
| 1,787,934 | Cooney | Jan. 6, 1931 |
| 1,801,618 | Spery | Apr. 21, 1931 |
| 2,060,674 | Hicks | Nov. 10, 1936 |
| 2,131,706 | Joyce | Sept. 27, 1938 |
| 2,207,715 | Bumstead | July 16, 1940 |
| 2,368,761 | Hogan | Feb. 6, 1945 |
| 2,469,655 | Leathers | May 10, 1949 |
| 2,563,041 | Johnston | Aug. 7, 1951 |
| 2,605,967 | Stone | Aug. 5, 1952 |

UNITED STATES PATENT OFFICE
CERTIFICATION OF CORRECTION

Patent No. 2,985,368

May 23, 1961

Charles F. Kohler et al.

It is hereby certified that error appears in the above numbered patent requiring correction and that the said Letters Patent should read as corrected below.

Column 9, line 15, for "protion" read -- portion --; column 13, line 61, for "persons" read -- person --; line 67, after "bell" insert -- 163 --; column 16, line 47, for "circuit 193" read -- conduit 193 --; line 75, for "a fault of production stoppages" read -- the fault of production stoppage --; column 17, line 6, for "samet" read -- same --; line 26, for "condit" read -- conduit --; column 24, line 5, for "auxiilary" read -- auxiliary --; column 25, line 60, for "register" read -- registers --; column 26, line 24, after "time" insert -- register for --; column 26, under the heading "UNITED STATES PATENTS" add the following:

1,242,483   Shuster et al ------ Oct. 9, 1917

Signed and sealed this 17th day of October 1961.

(SEAL)
Attest:

ERNEST W. SWIDER
Attesting Officer

DAVID L. LADD
Commissioner of Patents